US010063577B2

(12) United States Patent
Kapoor et al.

(10) Patent No.: US 10,063,577 B2
(45) Date of Patent: Aug. 28, 2018

(54) SECURING DEPLOYMENTS USING COMMAND ANALYTICS

(71) Applicant: International Business Machines Corporation, Armonk, NY (US)

(72) Inventors: Shalini Kapoor, Bangalore (IN); Palanivel Kodeswaran, Bangalore (IN); Amit A. Nanavati, Bangalore (IN); Sayandeep Sen, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 199 days.

(21) Appl. No.: 14/994,770

(22) Filed: Jan. 13, 2016

(65) Prior Publication Data

US 2017/0201541 A1  Jul. 13, 2017

(51) Int. Cl.
*G06F 15/16* (2006.01)
*H04L 29/06* (2006.01)
(Continued)

(52) U.S. Cl.
CPC ...... *H04L 63/1425* (2013.01); *H04L 63/0209* (2013.01); *H04L 63/1441* (2013.01);
(Continued)

(58) Field of Classification Search
CPC ............. H04L 63/1416; H04L 63/1408; H04L 63/1441; H04L 63/1458; G06F 21/552
(Continued)

(56) References Cited

U.S. PATENT DOCUMENTS 6,370,648 B1 * 4/2002 Diep ...................... G06F 21/55
706/13
7,684,892 B2   3/2010 Yuan et al.
(Continued)

FOREIGN PATENT DOCUMENTS

CN   103093570 A   5/2013
CN   103095691 A   5/2013
WO   2013113177 A1  8/2013

OTHER PUBLICATIONS

California Energy Commission, Advanced Automated HVAC Fault Detection and Diagnostics Commercialization Program, Dec. 2008.
(Continued)

*Primary Examiner* — Evans Desrosiers
(74) *Attorney, Agent, or Firm* — Ryan, Mason & Lewis, LLP

(57) ABSTRACT

Methods, systems, and computer program products for securing deployments using command analytics are provided herein. A computer-implemented method includes collecting command sequences sent from one or more applications to one or more of a distributed group of multiple devices within a network; detecting one or more invalid command sequences and/or one or more out-of-sequence command sequences among the collected command sequences, wherein said detecting comprises comparing the collected command sequences against a repository of historical data of valid command sequences pertaining to the distributed group of multiple devices within the network; generating an alert upon a determination that one of the collected command sequences does not match an entry in the repository; and performing one or more remedial actions based on the generated alert.

20 Claims, 7 Drawing Sheets

(51) Int. Cl.
  *H04W 12/08* (2009.01)
  *H04W 12/12* (2009.01)
  *H04W 4/70* (2018.01)

(52) U.S. Cl.
  CPC .......... *H04W 12/08* (2013.01); *H04W 12/12* (2013.01); *H04L 63/101* (2013.01); *H04W 4/70* (2018.02)

(58) Field of Classification Search
  USPC ......................................................... 726/11
  See application file for complete search history.

(56) References Cited

U.S. PATENT DOCUMENTS 8,595,826 B2 * 11/2013 Sekiya ............... G06K 7/10811
                                                    712/225
8,732,476 B1    5/2014 Van

OTHER PUBLICATIONS

Sidhu et al. Fast Regular Expression Matching Using FPGAs, FCCM '01 Proceedings of the 9th Annual IEEE Symposium on Field-Programmable Custom Computing Machines, 2001.
Wang et al. Towards Fast Regular Expression Matching in Practice, SIGCOMM'13, Aug. 2013.

* cited by examiner

SECURING DEPLOYMENTS USING COMMAND ANALYTICS

FIELD

The present application generally relates to information technology, (IT) and, more particularly, to IT security techniques.

BACKGROUND

Internet of Things (IoT) devices commonly encounter vulnerabilities such as software bugs (buffer overflows, etc.), un-encrypted transmission (plain hypertext transfer protocol (HTTP), etc.), weak encryption and key management and/or distribution, key storage on a device, over-simplified and/or weak username/password combinations, backdoor accounts, an excess of exposed services and/or a lack of hardening, a lack of firmware integrity checks, etc. Additionally, existing IoT device management techniques commonly fail to protect IoT devices from invalid and/or out-of-sequence virtual commands sent to devices through an IoT mediation framework that are hazardous to continuous operation of the devices as well as the systems in which such devices participate.

SUMMARY

In one embodiment of the present invention, techniques for securing deployments using command analytics are provided. An exemplary computer-implemented method can include collecting command sequences sent from one or more applications to one or more of a distributed group of multiple devices within a network, and detecting one or more invalid command sequences and/or one or more out-of-sequence command sequences among the collected command sequences, wherein detecting comprises comparing the collected command sequences against a repository of historical data of valid command sequences pertaining to the distributed group of multiple devices within the network. The exemplary computer-implemented method can also include generating an alert upon a determination that one of the collected command sequences does not match an entry in the repository, and performing one or more remedial actions based on the generated alert.

In another embodiment of the invention, an exemplary computer-implemented method can include automatically learning multiple patterns of deployment behavior across multiple Internet of Things deployments, and collecting command sequences sent from one or more applications to one or more of a distributed group of multiple devices within an Internet of Things network. The method can also include detecting one or more invalid command sequences and/or one or more out-of-sequence command sequences among the collected command sequences, wherein said detecting comprises comparing the collected command sequences to the multiple learned patterns of deployment behavior. Further, the method can include generating an alert upon a determination that one of the collected command sequences is not consistent with any of the multiple learned patterns of deployment behavior, and performing one or more remedial actions based on the generated alert.

Another embodiment of the invention or elements thereof can be implemented in the form of an article of manufacture tangibly embodying computer readable instructions which, when implemented, cause a computer to carry out a plurality of method steps, as described herein. Furthermore, another embodiment of the invention or elements thereof can be implemented in the form of an apparatus including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

Figure 1:
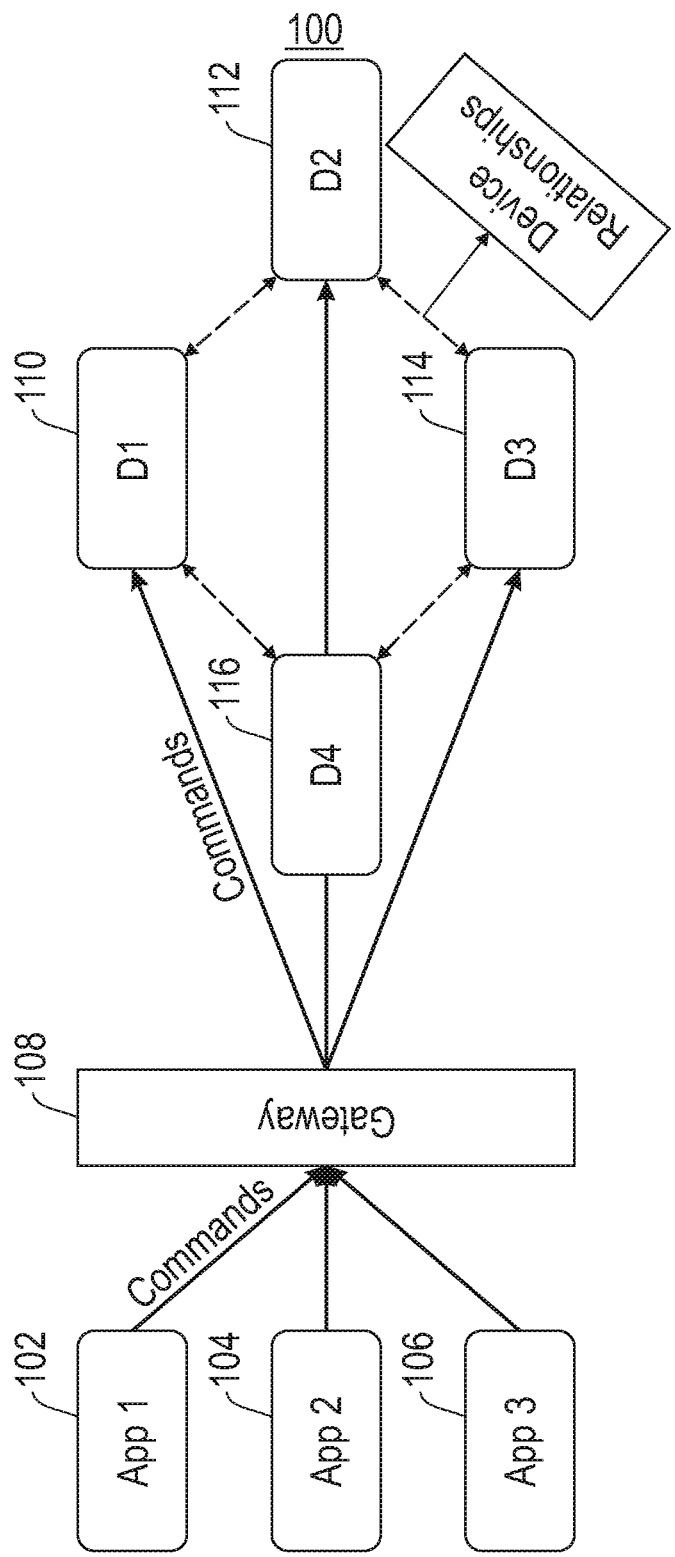
FIG. 1 is a diagram illustrating system architecture, according to an exemplary embodiment of the invention.

As described herein, an embodiment of the present invention includes securing IoT deployments using command analytics. At least one embodiment of the invention includes generating and implementing a Command Analytics Service (CoAS) to capture commands sent to devices on an IoT Cloud Foundation, and to utilize analytics to validate such commands. Such validation can include, for example, verifying whether each captured command is valid and/or consistent with normal and/or established behavior (within the IoT deployments), wherein normal behavior can be specified by an administrator or learnt from command sequences. As used herein, features and/or activities that can be encompassed by or identified as "behavior" can include, for example, a water pump being turned on before the (hot-water) geyser every morning, a tube light being turned on between 6:00 PM and 6:30 PM every evening and left on until 9:00 PM, etc.

Additionally, a CoAS can also be implemented to identify anomalous command patterns so as to generate alerts and propose and/or carry out remediation actions. As further detailed herein, one or more embodiments of the invention include implementing privacy preservation mechanisms, and also require no change to the devices while carrying out computations on the cloud. In at least one embodiment of the invention, privacy can be preserved at multiple levels: neither the user's identity nor the device's identity needs to be revealed. An abstract identifier can be used instead (for example, a microwave is referred to and/or identified as device "34").

At least one embodiment of the invention includes dynamically identifying anomalous command patterns by capturing and validating commands that are sent to devices on the Internet of Things (IoT). Such an embodiment can include collecting and normalizing valid command sequences from historical data and storing resulting patterns in a pattern repository for each of multiple device types (such as microwaves, fans, air-conditioners, washing machines, computers, etc.). Additionally, such an embodiment can include detecting invalid and/or out-of-sequence commands by matching captured sequences against the pattern repository and generating one or more alerts if a captured command does not match an entry in the pattern repository. Further, such an embodiment can also include performing remedial actions (such as disallowing an input command to an IoT device, for example) in connection with a generated alert.

As noted, the techniques detailed herein include learning valid command sequences among multiple devices from historical device usage data. Also one or more embodiments of the invention include ensuring that only commands that are both valid and arrive in the correct sequence (that is, permissible to device state) are allowed.

Learning acceptable sequences of commands for a distributed group of devices can include monitoring multiple command streams without any human intervention. Further, by generalizing command sequences across deployments, at least one embodiment of the invention can include bootstrapping the system in newer deployments. Such bootstrapping can be particularly useful as the number of devices as well as the number of deployments, increases within a system.

Additionally, at least one embodiment of the invention can include operating in both offline and online modes. By way of example, in such an embodiment, the offline mode can include automatically analyzing valid temporal command sequences from historical data, and storing resulting patterns in a pattern repository. The offline mode can also include generalizing valid command sequences across multiple similar deployments. By way of example, assume that there are two homes: Home1 and Home2. In Home1, the sequence of actions each morning before 9:00 AM includes the following: "tube light on→water heater on→exhaust fan on→microwave on→TV on. In Home2, the sequence of actions each morning before 9:00 AM includes the following: "water heater on→washing machine on→TV on. Accordingly, the generalized valid command sequence (with respect to Home1 and Home2) is: "water heater on→TV on," because this order applies in both homes.

Additionally, for example, in an embodiment such as noted above, the online mode can include detecting one or more out-of-sequence commands by prefix matching captured commands against the pattern repository, and generating one or more alerts when an invalid command sequence is submitted at an IoT mediation layer. Also, individual command validation can be performed, for example, through a dictionary look-up of a command repository that is registered for each device type.

FIG. 1 is a diagram illustrating system architecture, according to an embodiment of the invention. By way of illustration, FIG. 1 depicts device control and orchestration from the Cloud. Specifically, FIG. 1 depicts a first application 102, a second application 104, and a third application 106, all of which interact with a gateway component 108. The gateway component 108 additionally provides instructions to a first device 110, a second device 112, a third device 114, and a fourth device 116. Also, as illustrated in FIG. 1, each of the devices maintains a relationship with one or more of the other devices. FIG. 1 depicts the system setting in which one or more embodiments of the invention can be applicable, wherein one or many applications (apps 102, 104 and 106, for instance) with accurate credentials authenticate with the gateway 108. Additionally, as depicted, the authenticated devices submit commands to be executed on multiple IoT devices (devices 110, 112, 114 and 116, for example, and for which the sending app has permission).

Figure 2:
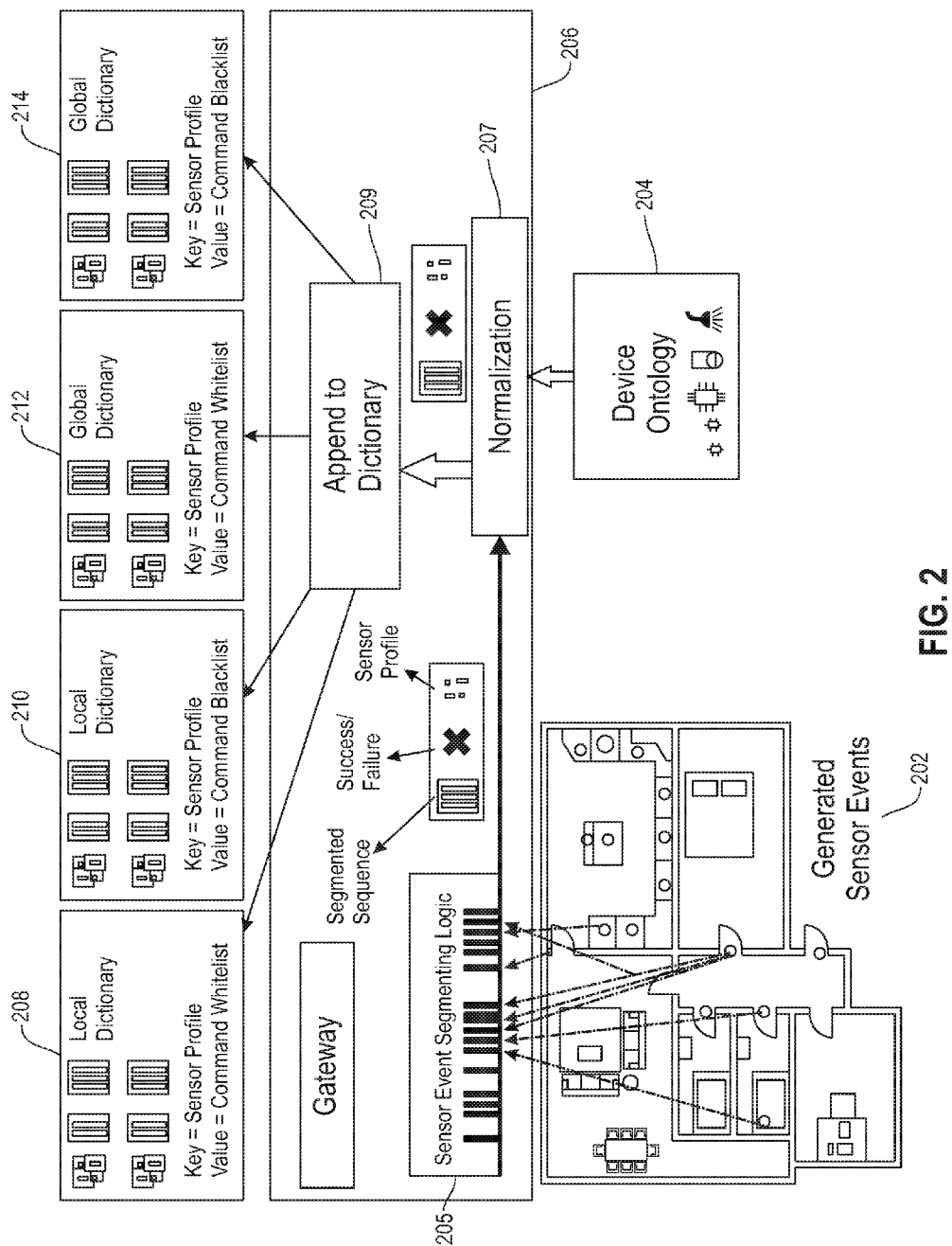
FIG. 2 is a diagram illustrating build-time system architecture, according to an embodiment of the invention.

FIG. 2 is a diagram illustrating build-time system architecture, according to an embodiment of the invention. Specifically, FIG. 2 depicts rule list creation in accordance with one or more embodiments of the invention. As illustrated, FIG. 2 depicts generated sensor events 202, a device ontology 204, and a gateway component 206, which includes sensor event segmentation logic 205 and a normalization component 207. By way merely of illustration, a sensor event can include, for example, "opening refrigerator door," "switching the porch light on," "temperature reading is 80F," etc. The generated sensor events 202 are transmitted to the sensor event segmenting logic 205 of the gateway component 206, and sensor event segmenting logic 205 as well as the device ontology 204 provide input to the normalization component 207 of the gateway component 206. The sensor event will include information such as, for example, <timestamp, sensor name, sensor type, sensor status>.

The normalization component 207 generates an output and appends such output via component 209 to one or more dictionaries among a local dictionary white list 208, a local dictionary black list 210, a global dictionary white list 212, and a global dictionary black list 214. The normalization component 207 converts custom information regarding devices from multiple different sources (homes) into a common name. For example, in Home1, the refrigerator is made by Company1, and the sensor name might be Company1-fridge-100. In Home2, the refrigerator might be made by Company2, and the sensor name might be Company2-fridge-25. After normalization, both sensors will be named using a common representation. For instance, Company1-fridge-100 might become Fridge-1, and Company2-fridge-25 might become Fridge-2.

Additionally, as used herein, a local dictionary is only available for checking instructions intended for a specific deployment. In contrast, a global dictionary can include a common dictionary which can be used by all deployments. In other words, each deployment will share a global dictionary and have its own local dictionary.

Figure 3:
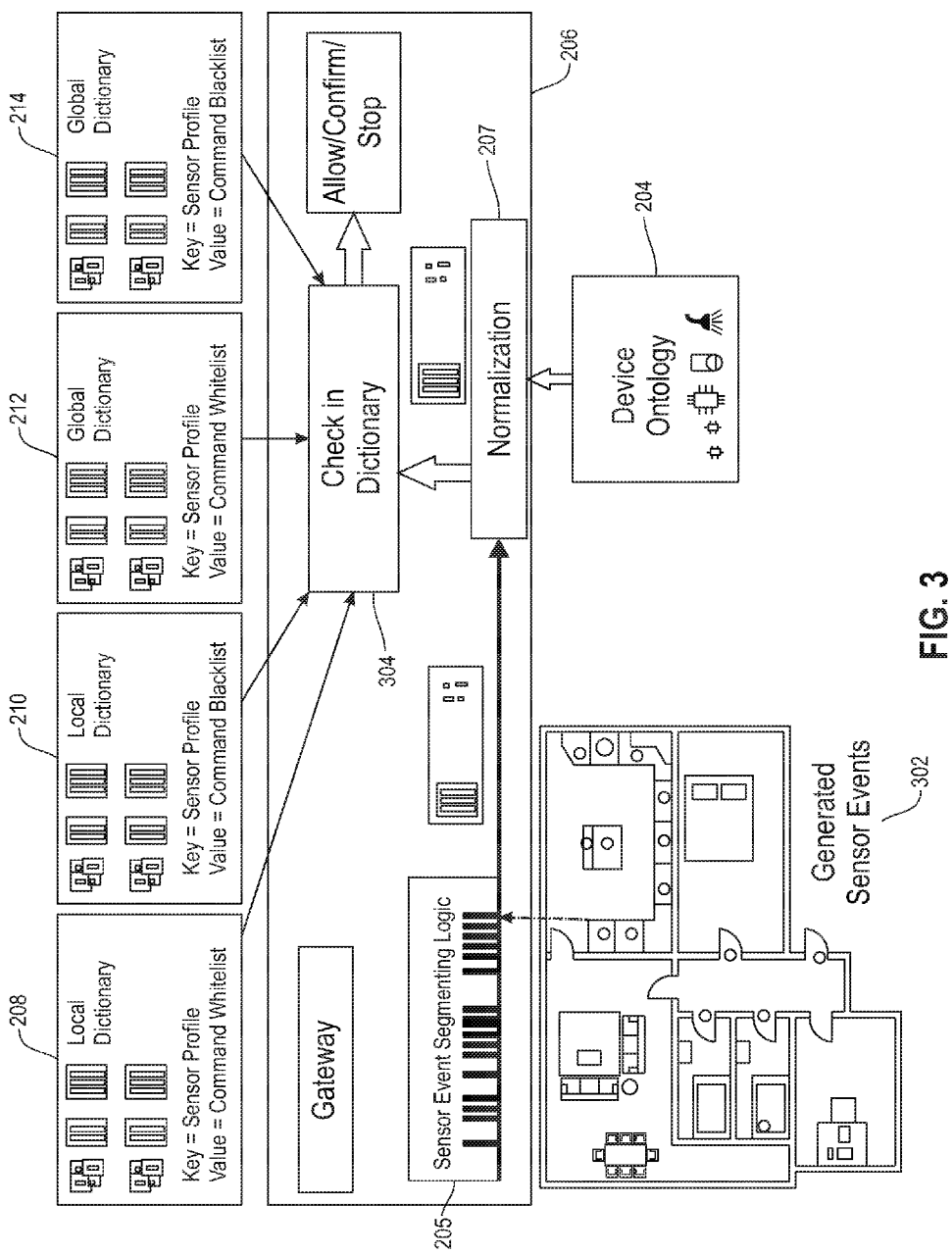
FIG. 3 is a diagram illustrating run-time system architecture, according to an embodiment of the invention.

FIG. 3 is a diagram illustrating run-time system architecture, according to an embodiment of the invention. Specifically, FIG. 3 depicts rule list checking in accordance with one or more embodiments of the invention. As illustrated, generated sensor events 302 are transmitted to the sensor event segmenting logic 205 of the gateway component 206, and sensor event segmenting logic 205 as well as the device ontology 204 provide input to the normalization component 207 of the gateway component 206. For example, the sensor event segmenting logic 205 transmits a collection of sensor events to the normalization component. The normalization component 207 generates an output (a collection of normalized sensor events) and provides such output to a dictionary checking component 304, which also receives input from local dictionary white list 208, local dictionary black list 210, global dictionary white list 212, and global dictionary black list 214. Input provided by local dictionary white list 208, local dictionary black list 210, global dictionary white list 212, and global dictionary black list 214 to the dictionary checking component 304 can include, for example, the following: <key=sensor name, value=allowed commands of a sensor event type>.

In at least one embodiment of the invention, entries are compared across global black and white lists, local black and white lists, and actions corresponding thereto. Based on the processing of such received inputs, the dictionary checking component 304 generates an instruction output indicating that a command is to be allowed, confirmed, and/or stopped. The instruction can be output to the designated device (that is, the device for which the command was intended).

Figure 4:
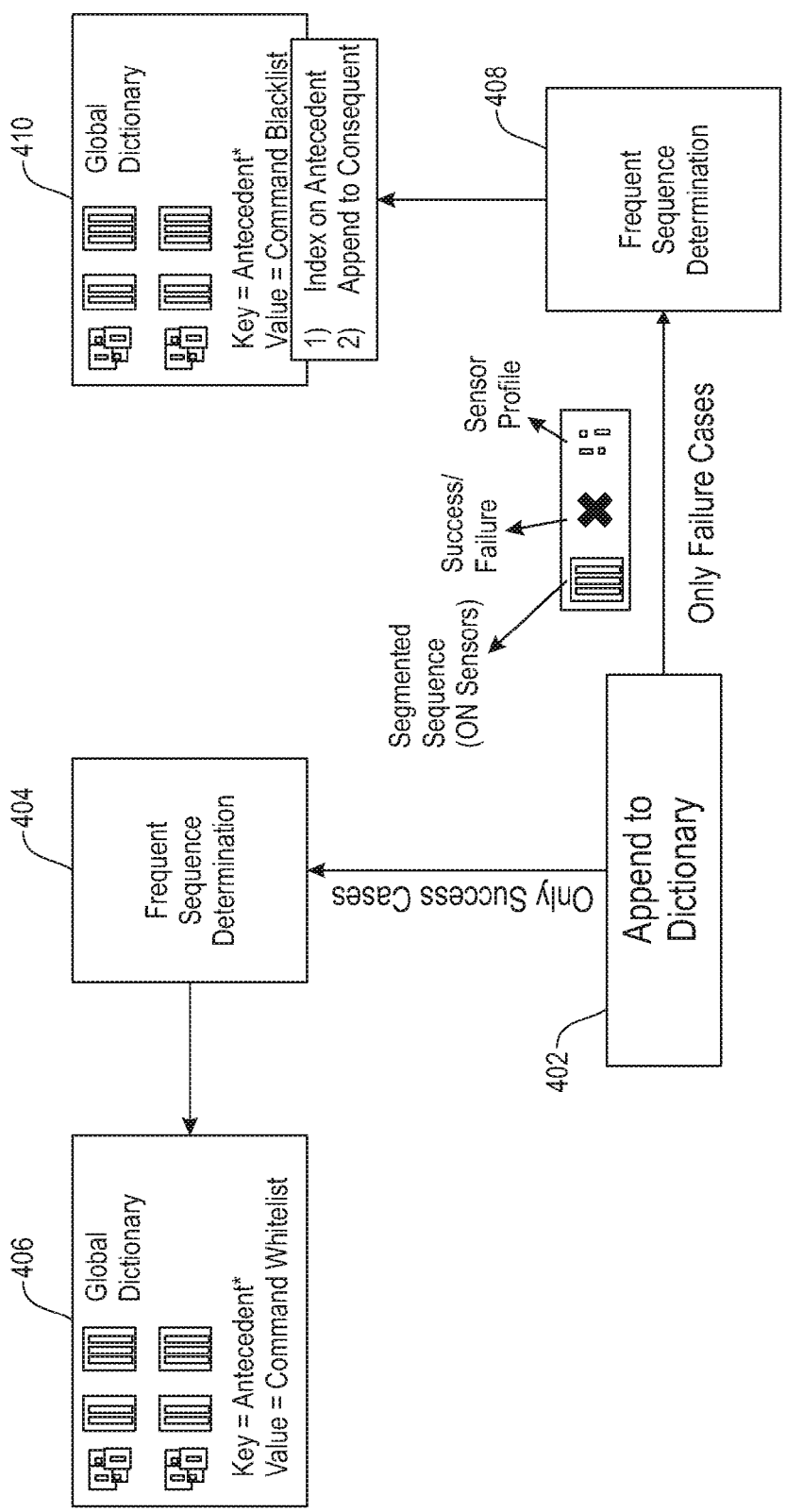
FIG. 4 is a diagram illustrating list creation, according to an exemplary embodiment of the invention.

FIG. 4 is a diagram illustrating list creation, according to an exemplary embodiment of the invention. Specifically, FIG. 4 depicts the creation of black and white lists. As illustrated, component 402, which appends outputs to one or more dictionaries, provides only success cases to a frequent sequence determination component 404, which subsequently provides an output to a global dictionary white list 406. As used herein, "success" cases include cases wherein the execution of the present command did not lead to any fault, crash and/or failure. As also illustrated, component 402 provides only failure cases to a frequent sequence determination component 408, which subsequently provides an output to a global dictionary black list 410. As used herein, failure cases include cases wherein the execution of the present command leads to a fault, crash and/or failure.

In connection with the example embodiment depicted in FIG. 4, an antecedent within a dictionary can include sensor states, connectivity patterns, as well as other information. Additionally, a consequent can include the sensor whose operation is OK or not OK, depending on the list.

By way of illustration, consider an example use case scenario of smart home deployments. In such an example scenario, a local sequence learned from an analyzing input streams can include the following: front door: open; living room lights: on; Stove: X (wherein "X" indicates a failure); Fridge: X; and front door: close. The actions contained within this learned sequence can be compared to a local black and a local white list, as well as to a global black and a global white list, and if any actions of the sequence are found in a black list, the user can be alerted at a given level of severity. In one or more embodiments of the invention, severity information can be provided as an input by subject matter experts.

Other example use case scenarios can include, for instance, implementation of one or more embodiments of the invention within the context of driverless automobiles.

At least one embodiment of the invention can include registering meta information about each of one or more onboard devices to a platform, wherein such meta information can include device type selected from the device ontology, reachability information of the device (such as Internet protocol (IP) address), a set of valid commands as well as good and/or bad states of the device. By way merely of example, a bad state for a device such as a toaster or a microwave can be when the device is overheated. If a device type is not present in the device ontology, one or more embodiments of the invention can include adding the device type to the ontology such that the system learns the device's relationship with the other devices in the system.

Additionally, at least one embodiment of the invention can also include registering a group of devices. Such an embodiment can include constructing a group (using a user interface (UI), for example) within the set of registered devices, as well as registering meta information about the group of devices such as, for example, how the devices are interconnected, a set of valid command sequences for the group, good and bad states for the group of devices as a function of individual device states, etc.

Further, as detailed herein, one or more embodiments of the invention can include creating local and global rule lists by analyzing valid and invalid command sequences from incoming streams as well as registered meta information. At least one embodiment of the invention can additionally include monitoring incoming command streams to devices (within the system), and using deployment information and antecedents in determined rules to obtain appropriate white and/or black lists from a global rule list.

Such an embodiment can include creating a whitelist of commands by observing (over a large number of deployments) that a particular sequence of commands did not cause more than an allowable number of failures. Similarly, such an embodiment can include creating a blacklist of commands by observing (over a large number of deployments) that the particular sequence of commands causes more than an allowable number of failures.

At least one embodiment of the invention can also include implementing command rate analysis. By way of illustration, consider an example scenario wherein an application sends device commands on a particular topic. In such a scenario, an example embodiment of the invention can include identifying abnormal patterns in the command behavior, as well as customizing one or more rate analysis thresholds for each command type. By way merely of example, such thresholds can include, for instance, a threshold indicating that a water heater may not be tuned on/off more than two times a minute, and not more than 10 times in two hours.

Further, as described herein, one or more embodiments of the invention include implementing command analysis by capturing a command flow at an IoT foundation, consulting a device type registry to verify validity of the command, and generating an alert if the command is determined to be invalid.

Figure 5:
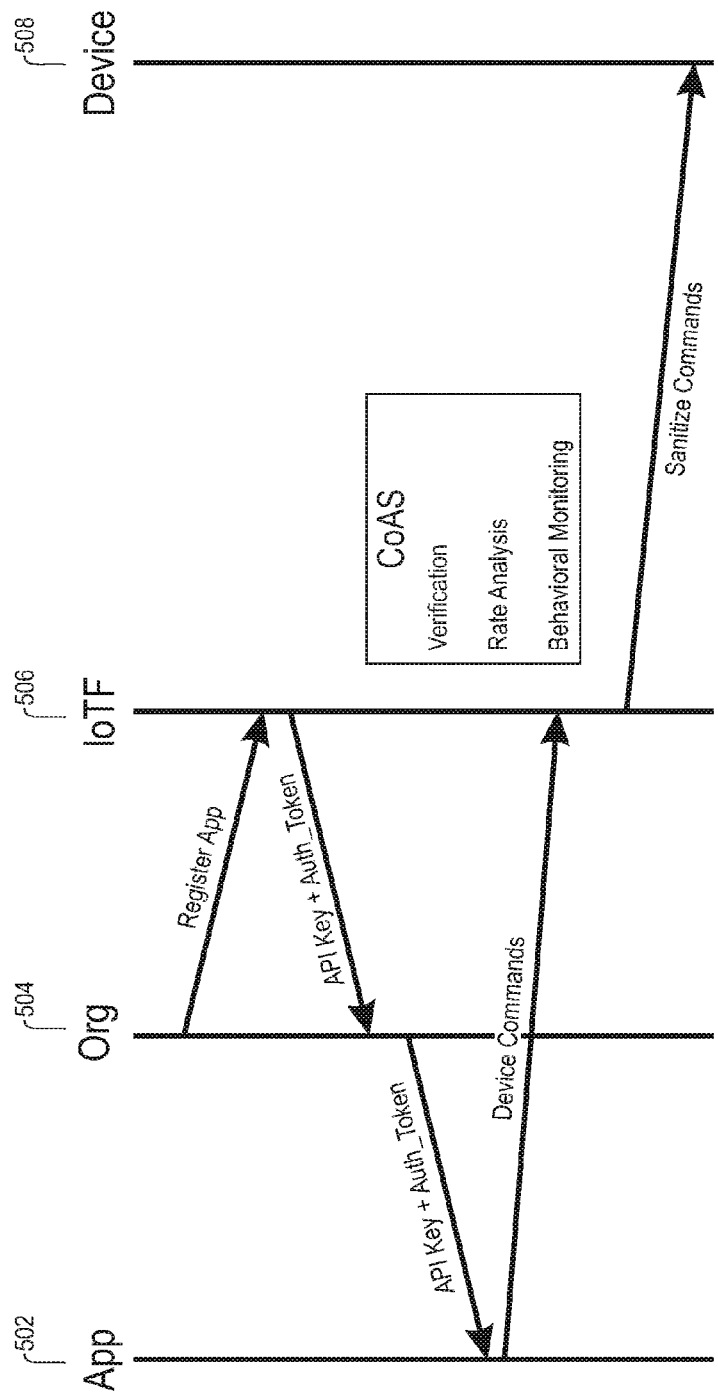
FIG. 5 is a diagram illustrating a command analytics service in an IoT foundation, according to an exemplary embodiment of the invention.

FIG. 5 is a diagram illustrating a command analytics service in an IoT foundation (IoTF), according to an exemplary embodiment of the invention. Specifically, FIG. 5 depicts capturing application-command flows and performing command analysis across an application 502, an organization 504, an IoTF 506, and a device 508. As illustrated, the organization 504 registers the application 502 with the IoTF 506, and the IoTF 506, in response thereto, provides an application programming interface (API) key and authentication token to the organization 504, which subsequently forwards the same along to the application 502. Subsequently, the application 502 sends device commands to the IoTF 506, wherein a CoAS is implemented to carry out actions of verification, rate analysis and behavioral monitoring, before sanitized versions of the commands are forwarded by the IoTF 506 to the device 508. As used herein, a "sanitized" version of a command can include an altered version of an inappropriate command, wherein such alterations can include not sending the command to the device, replacing the inappropriate command with one or more other commands, etc.

Figure 6:
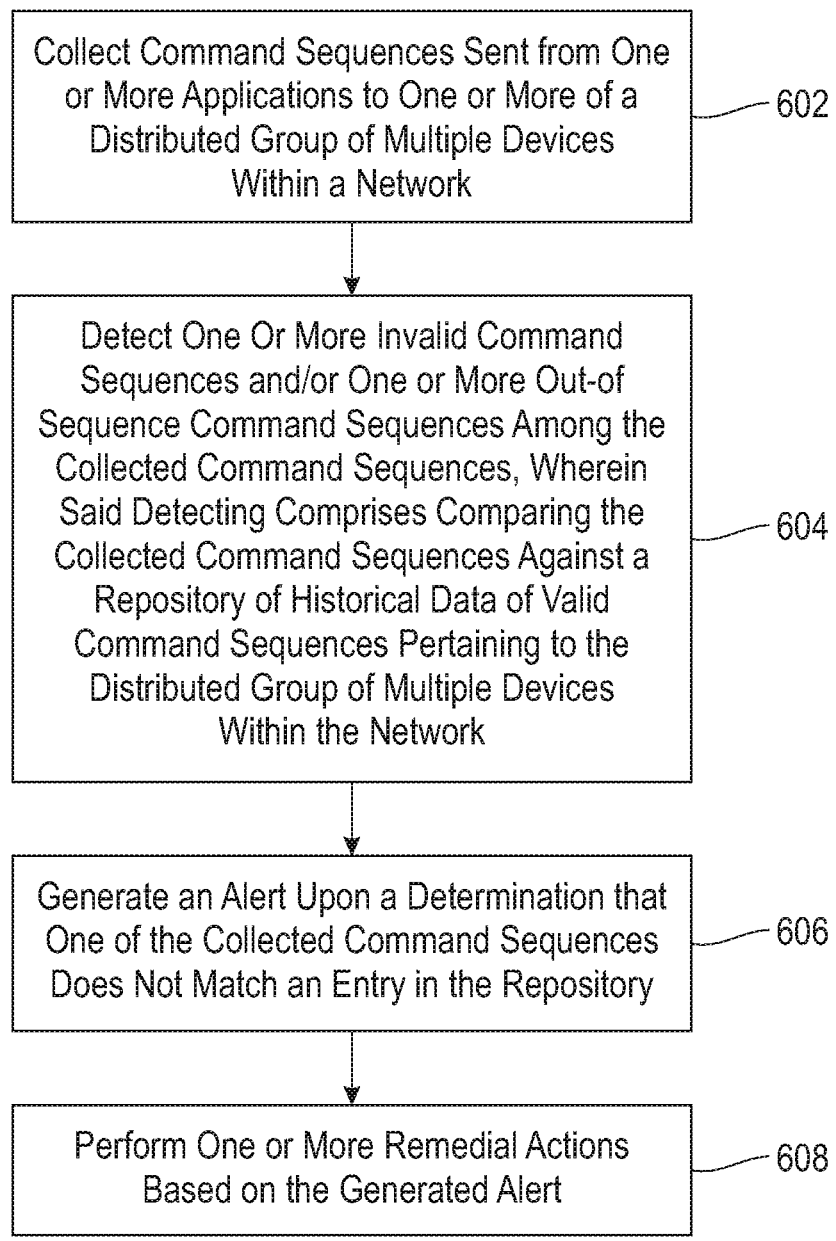
FIG. 6 is a flow diagram illustrating techniques according to an embodiment of the invention.

FIG. 6 is a flow diagram illustrating techniques according to an embodiment of the present invention. Step 602 includes collecting command sequences sent from one or more applications to one or more of a distributed group of multiple devices within a network. In one or more embodiments of the invention, the network can include an IoT network.

Step 604 includes detecting one or more invalid command sequences and/or one or more out-of-sequence command sequences among the collected command sequences, wherein said detecting comprises comparing the collected command sequences against a repository of historical data of valid command sequences pertaining to the distributed group of multiple devices within the network.

Step 606 includes generating an alert upon a determination that one of the collected command sequences does not match an entry in the repository. Step 608 includes performing one or more remedial actions based on the generated alert. The remedial actions can include disallowing the collected command sequence that does not match an entry in the repository.

The techniques depicted in FIG. 6 can also include storing each valid command sequence from the collected command sequences in the repository of historical data. Additionally, at least one embodiment of the invention can include normalizing all of the valid command sequences from the historical data, determining one or more patterns across the normalized valid command sequences, and storing the one or more determined patterns in a pattern repository for each of multiple device types.

Additionally, the techniques depicted in FIG. 6 can include building a prefix tree for each of the valid command sequences from the historical data, and comparing the collected command sequences against the prefix trees for the valid command sequences. Further, at least one embodiment of the invention can include identifying one or more valid command sequences among the collected command sequences, wherein said identifying comprises comparing the collected command sequences against one or more dictionaries of command sequences registered against each of one or more device type. Also, one or more embodiments of the invention include measuring a rate at which each of multiple types of commands are sent to a target device from each of multiple source applications.

The techniques depicted in FIG. 6 can also include generalizing one or more valid command sequences learnt across multiple deployments of the multiple devices within the network, wherein said generalizing comprises (i) clustering similar instances among the multiple deployments of the multiple devices into one or more groups, and (ii) identifying one or more common command patterns within each of the one or more groups. Additionally, one or more embodiments of the invention can include bootstrapping command validation in a subsequent deployment of one or more of the multiple devices within the network based on the one or more generalized valid command sequences.

Also, an additional embodiment of the invention includes automatically learning multiple patterns of deployment behavior across multiple IoT deployments, and collecting command sequences sent from one or more applications to one or more of a distributed group of multiple devices within an IoT network. Such an embodiment can also include detecting one or more invalid command sequences and/or one or more out-of-sequence command sequences among the collected command sequences, wherein said detecting comprises comparing the collected command sequences to the multiple learned patterns of deployment behavior. Further, such an embodiment can include generating an alert upon a determination that one of the collected command sequences is not consistent with any of the multiple learned patterns of deployment behavior, and performing one or more remedial actions based on the generated alert.

At least one embodiment of the invention (such as the techniques depicted in FIG. 6, for example), can include implementing a service via a transmission server to receive data from a data source and send selected data to users (for example, at a provided destination address of a wireless device (such as a number for a cellular phone, etc.)). The transmission server includes a memory, a transmitter, and a microprocessor. Such an embodiment of the invention can also include providing a viewer application to the users for installation on their individual devices. Additionally, in such an embodiment of the invention, after a user enrolls, the service receives command-related information sent from a data source to the transmission server. The server can process the information, for example, based upon user-provided user preference information and/or dictionary-related information that is stored in memory on the server. Subsequently, an alert is generated containing the command-related information. The alert can be formatted into data blocks, for example, based upon any provided alert format preference information. Subsequently, the alert and/or formatted data blocks are transmitted over a data channel to the user's wireless device. After receiving the alert, the user can connect the wireless device to the user's computer, whereby the alert causes the user's computer to automatically launch the application provided by the service to display the alert. When connected to the Internet, the user may then use the viewer application (for example, via clicking on a uniform resource locator (URL) associated with the data source provided in the alert) to facilitate a connection from the remote user computer to the data source over the Internet for additional information.

The techniques depicted in FIG. 6 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 6 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 7:
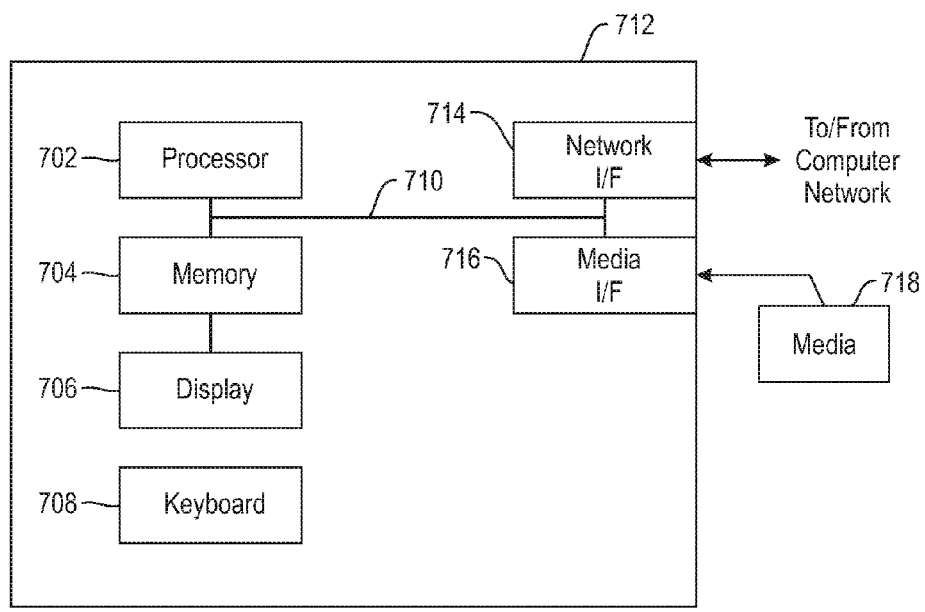
FIG. 7 is a system diagram of an exemplary computer system on which at least one embodiment of the invention can be implemented.

Additionally, an embodiment of the present invention can make use of software running on a computer or workstation. With reference to FIG. 7, such an implementation might employ, for example, a processor 702, a memory 704, and an input/output interface formed, for example, by a display 706 and a keyboard 708. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 702, memory 704, and input/output interface such as display 706 and keyboard 708 can be interconnected, for example, via bus 710 as part of a data processing unit 712. Suitable interconnections, for example via bus 710, can also be provided to a network interface 714, such as a network card, which can be provided to interface with a computer network, and to a media interface 716, such as a diskette or CD-ROM drive, which can be provided to interface with media 718.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 702 coupled directly or indirectly to memory elements 704 through a system bus 710. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 708, displays 706, pointing devices, and the like) can be coupled to the system either directly (such as via bus 710) or through intervening I/O controllers (omitted for clarity).

Network adapters such as network interface 714 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 712 as shown in FIG. 7) running a server program. It will be understood that such a physical server may or may not include a display and keyboard.

The present invention may be a system, a method, and/or a computer program product at any possible technical detail level of integration. The computer program product may include a computer readable storage medium (or media) having computer readable program instructions thereon for causing a processor to carry out embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 702. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

Additionally, it is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present invention may provide a beneficial effect such as, for example, determining acceptable sequences of commands for a distributed group of devices by monitoring command streams without the need for human intervention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   automatically learning multiple patterns of deployment behavior across multiple Internet of Things deployments;
   collecting command sequences sent from one or more applications to one or more of a distributed group of multiple Internet of Things devices within an Internet of Things network;
   detecting one or more invalid command sequences and/or one or more out-of-sequence command sequences among the collected command sequences, wherein said detecting comprises comparing the collected command sequences against a repository of historical data, wherein the repository of historical data comprises entries of (i) valid command sequences pertaining to the distributed group of multiple Internet of Things devices within the Internet of Things network and (ii) the learned patterns of deployment behavior;
   generating an alert upon a determination that one of the collected command sequences does not match at least one of the entries in the repository; and
   performing one or more remedial actions based on the generated alert;
      wherein the steps are carried out by at least one computing device.

2. The computer-implemented method of claim 1, comprising:
   storing each valid command sequence from the collected command sequences in the repository of historical data.

3. The computer-implemented method of claim 1, comprising:
   normalizing all of the valid command sequences from the historical data.

4. The computer-implemented method of claim 3, comprising:
   determining one or more patterns across the normalized valid command sequences.

5. The computer-implemented method of claim 4, comprising:
   storing the one or more determined patterns in a pattern repository for each of multiple Internet of Things device types.

6. The computer-implemented method of claim 1, comprising:
   building a prefix tree for each of the valid command sequences from the historical data.

7. The computer-implemented method of claim 6, comprising:
   comparing the collected command sequences against the prefix trees for the valid command sequences.

8. The computer-implemented method of claim 1, wherein said one or more remedial actions comprises disallowing the collected command sequence that does not match an entry in the repository.

9. The computer-implemented method of claim 1, comprising:
   identifying one or more valid command sequences among the collected command sequences, wherein said identifying comprises comparing the collected command sequences against one or more dictionaries of command sequences registered against each of one or more Internet of Things device type.

10. The computer-implemented method of claim 1, comprising:
measuring a rate at which each of multiple types of commands are sent to a target Internet of Things device from each of multiple source applications.

11. The computer-implemented method of claim 1, comprising:
generalizing one or more valid command sequences learnt across multiple deployments of the multiple Internet of Things devices within the Internet of Things network.

12. The computer-implemented method of claim 11, comprising:
bootstrapping command validation in a subsequent deployment of one or more of the multiple Internet of Things devices within the Internet of Things network based on the one or more generalized valid command sequences.

13. The computer-implemented method of claim 11, wherein said generalizing comprises (i) clustering similar instances among the multiple deployments of the multiple Internet of Things devices into one or more groups, and (ii) identifying one or more common command patterns within each of the one or more groups.

14. A computer program product comprising a computer readable storage medium having program instructions embodied therewith, the program instructions executable by a device to cause the device to:
automatically learning multiple patterns of deployment behavior across multiple Internet of Things deployments;
collect command sequences sent from one or more applications to one or more of a distributed group of multiple Internet of Things devices within an Internet of Things network;
detect one or more invalid command sequences and/or one or more out-of-sequence command sequences among the collected command sequences, wherein said detecting comprises comparing the collected command sequences against a repository of historical data, wherein the repository of historical data comprises entries of (i) valid command sequences pertaining to the distributed group of multiple Internet of Things devices within the Internet of Things network and (ii) the learned patterns of deployment behavior;
generate an alert upon a determination that one of the collected command sequences does not match at least one of the entries in the repository; and
perform one or more remedial actions based on the generated alert.

15. The computer program product of claim 14, wherein the program instructions executable by a computing device further cause the computing device to:
store each valid command sequence from the collected command sequences in the repository of historical data.

16. The computer program product of claim 14, wherein the program instructions executable by a computing device further cause the computing device to:
normalize all of the valid command sequences from the historical data.

17. The computer program product of claim 16, wherein the program instructions executable by a computing device further cause the computing device to:
determine one or more patterns across the normalized valid command sequences.

18. The computer program product of claim 14, wherein the program instructions executable by a computing device further cause the computing device to:
identify one or more valid command sequences among the collected command sequences, wherein said identifying comprises comparing the collected command sequences against one or more dictionaries of command sequences registered against each of one or more Internet of Things device types.

19. A system comprising: a memory; and
at least one processor coupled to the memory and configured for:
automatically learning multiple patterns of deployment behavior across multiple Internet of Things deployments;
collecting command sequences sent from one or more applications to one or more of a distributed group of multiple Internet of Things devices within an Internet of Things network;
detecting one or more invalid command sequences and/or one or more out-of-sequence command sequences among the collected command sequences, wherein said detecting comprises comparing the collected command sequences against a repository of historical data, wherein the repository of historical data comprises entries of (i) valid command sequences pertaining to the distributed group of multiple Internet of Things devices within the Internet of Things network and (ii) the learned patterns of deployment behavior;
generating an alert upon a determination that one of the collected command sequences does not match at least one of the entries in the repository; and
performing one or more remedial actions based on the generated alert.

20. A computer-implemented method, comprising:
automatically learning multiple patterns of deployment behavior across multiple Internet of Things deployments;
collecting command sequences sent from one or more applications to one or more of a distributed group of multiple devices within an Internet of Things network;
detecting one or more invalid command sequences and/or one or more out-of-sequence command sequences among the collected command sequences, wherein said detecting comprises comparing the collected command sequences to the multiple learned patterns of deployment behavior;
generating an alert upon a determination that one of the collected command sequences is not consistent with any of the multiple learned patterns of deployment behavior; and
performing one or more remedial actions based on the generated alert;
wherein the steps are carried out by at least one computing device.

* * * * *